United States Patent
Keld

(10) Patent No.: US 8,352,366 B1
(45) Date of Patent: Jan. 8, 2013

(54) METHOD AND SYSTEM FOR FLEXIBLE PAYMENT PROCESSING

(75) Inventor: Marcia Keld, Middleton, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 386 days.

(21) Appl. No.: 12/565,883

(22) Filed: Sep. 24, 2009

(51) Int. Cl.
*G06Q 40/00* (2012.01)

(52) U.S. Cl. .......................... 705/40; 705/38

(58) Field of Classification Search .................. 235/380, 235/379; 705/35, 40, 34, 39, 38, 36 R, 37, 705/4, 41
See application file for complete search history.

(56) References Cited

U.S. PATENT DOCUMENTS

| | | | |
|---|---|---|---|
| 6,315,196 B1 * | 11/2001 | Bachman | 235/380 |
| 7,801,790 B1 * | 9/2010 | Dickey et al. | 705/36 R |
| 7,870,048 B2 * | 1/2011 | Bhagwat | 705/35 |
| 8,036,964 B2 * | 10/2011 | Savasoglu et al. | 705/35 |
| 2004/0199406 A1 * | 10/2004 | Owens et al. | 705/2 |
| 2005/0021405 A1 * | 1/2005 | Agarwal | 705/14 |
| 2009/0210339 A1 * | 8/2009 | Bhagwat | 705/38 |
| 2011/0208640 A1 * | 8/2011 | Geoghegan et al. | 705/39 |

OTHER PUBLICATIONS

Guttentag, Jack "A flexible payment mortgage" Nov. 1999 Mortgage Banking , v 60 , n. 2 , p. 94-99.*
Mirabella, Lorraine "Utility bill payment plan approved: Shutoffs ban lifted, but customers can arrange interest-free payments" Apr. 29, 2009Baltimore Sun.*

* cited by examiner

*Primary Examiner* — Kelly Campen
(74) *Attorney, Agent, or Firm* — Goodwin Procter LLP

(57) ABSTRACT

A computer-implemented method is provided for enhancing payment flexibility. The method includes receiving payment notification including a payment amount and a payment date for an identified customer and determining eligibility for flexible payment status implementing the computer processor, the determination based on the customer identity, the payment date, and a payment due date. The method further includes calculating a flex accrual using the computer processor if the customer is eligible for flexible payment status, the flex accrual based on the payment amount, the payment date, and the payment due date and communicating the flex accrual to the customer. The method additionally includes allowing the identified customer to utilize the flex accrual by making a late payment without penalty, wherein a number of days late and dollars paid are determined based on the flex accrual.

22 Claims, 5 Drawing Sheets

METHOD AND SYSTEM FOR FLEXIBLE PAYMENT PROCESSING

TECHNICAL FIELD

Embodiments of the invention are related generally to systems and methods for implementing a flexible payment platform for credit account payments.

BACKGROUND OF THE INVENTION

While the credit card industry offers an option for customers to delay payments until a monthly due date without penalty, payments that are made after the due date typically incur finance charges, interest, penalties, or a combination thereof. While the credit payment cycle traditionally repeats on a monthly basis, many customers, in particular small business customers, do not have consistent monthly cash flow and therefore find the credit card system unduly burdensome and inconvenient. Such businesses may instead opt to take a direct line of credit from vendors associated with the same industry, as these vendors are likely to offer more flexible payment terms.

However, even a direct line of credit from a vendor may not provide adequate flexibility for all customers. For example, many small businesses operate on a seasonal basis and may have consistent cash flow through one or two seasons and virtually no incoming revenue through the remaining seasons. For example, those in the construction business, a landscaping business, or a water sports business may have ample summer revenue, but very little winter revenue. Similarly, customers in winter sports related businesses, snow plow operators, or those operating businesses in winter resort areas may operate at full capacity in the winter, but in a very limited capacity in the off-season.

Additionally, within the routine operating parameters of a small business, cash flow may be inconsistent. For example, a contractor may use a credit card to buy materials for a remodeling, job for a client. The client may have only paid the contractor 10% of the total cost upon accepting the bid. Thus, in this month, the contractor may have suffered a net loss due to the cost of materials and will need flexibility to make a late payment. However, the next month, the contractor may be paid in full for a job and may be able to make an early payment. Alternatively, in some circumstances, a business owner may be compelled to skip a monthly payment entirely when cash flow is reduced.

Although it is known in the credit card industry to provide various rewards platforms, customers have been typically unable to use these rewards to introduce flexibility into their individual repayment agreements. Furthermore, although it is known to allow credit card holders to carry a balance, this balance is subject to various fees and thus does not introduce true flexibility in the repayment program to meet the needs of customers having a business cycle that does not correspond to the typical monthly credit card repayment cycle.

Accordingly, a credit payment solution is needed that attract business owners by providing greater flexibility of payment terms on an ongoing basis. The solution should provide credit customers with the ability to manage credit payments in view of inconsistent cash-flow. The flexibility is particularly useful to small business owners as they often struggle with cash flow management.

BRIEF SUMMARY OF THE INVENTION

In one aspect of the invention, a computer-implemented method is provided for enhancing payment flexibility implementing a computer processor accessing at least one storage medium. The method comprises receiving payment notification including a payment amount and a payment date for an identified customer, determining eligibility for flexible payment status implementing the computer processor, the determination based on the customer identity, the payment date, and a payment due date. The method further includes calculating a flex accrual using the computer processor if the customer is eligible for flexible payment status, the flex accrual based on the payment amount, the payment date, and the payment due date. The method further includes communicating the flex accrual to the customer and allowing the identified customer to utilize the flex accrual without penalty by making a late payment, wherein a number of days late and number of dollars are determined by the flex accrual.

In a further aspect of the invention, a flexible payment processing system is provided for determining a flex accrual allowing customers to make payments on a flexible schedule. The system implements a computer processor accessing at least one storage medium and comprises a payment information interface for receiving information pertaining to a customer payment amount, a customer payment date, and a corresponding due date. The system additionally comprises a flex eligibility determination engine implemented by the computer processor for determining eligibility for flex accrual based on the customer identity, the payment date, and the corresponding due date and a flex accrual calculator for calculating the flex accrual using the computer processor if the customer is eligible for flexible payment status, the flex accrual based on the payment amount, the payment date, and the payment due date. The system further comprises a flex redemption engine for utilizing the accumulated flex accrual to accept at least a portion of a late payment for eligible customers and a flex status communication engine for communicating with the customers to provide flex accrual information determined by the flex accrual calculator.

In yet a further aspect of the invention, a flexible payment processing system is provided for determining a flex accrual allowing customers to make payments on a flexible schedule. The system implements a computer processor accessing at least one storage medium and comprises a customer record for storing customer eligibility data and flex accrual units, the customer record stored in a storage medium. The system additionally comprises a payment information interface for receiving information pertaining to a customer payment amount, a customer payment date, and a corresponding due date. A flex eligibility determination engine may be implemented by the computer processor for accessing the customer record in the storage medium and determining eligibility for flex accrual based on the customer eligibility from the customer record, the payment date, and the corresponding due date. The system may additionally include a flex accrual calculator for calculating the flex accrual using the computer processor if the customer is eligible for flexible payment status, the flex accrual calculated using a flex accrual equation and based on the payment amount, the payment date, and the payment due date. Flex planning tools may be provided for allowing an eligible customer to select future payment dates using flex accrual. A flex accrual redemption engine may be provided for processing customer payments utilizing accrued flex accrual; and for adjusting the stored flex accrual. A flex status communication engine may be provided for communicating with the customers to provide flex accrual information determined by the flex accrual calculator.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to a flexible payment platform for enabling credit customers, particularly small business owners, to have the ability to pay credit bills on a more flexible schedule rather than on the rigid monthly schedule typically followed by the card issuer. The system accrues flex units in accordance with one of various flex units accrual formulas. Redemption of the flex units may be subject to certain rules and regulations. However, redemption of the flex units frees credit customers from the rigors of a monthly payment cycle. When a customer pays a credit bill earlier than the due date, flexible payment system determines the amount paid and the number of days early the amount is paid. The recorded amount and number of days are then inserted into a flex accrual formula for calculating flex units that may be banked in order to extend future payment due dates for the customer.

Figure 1:
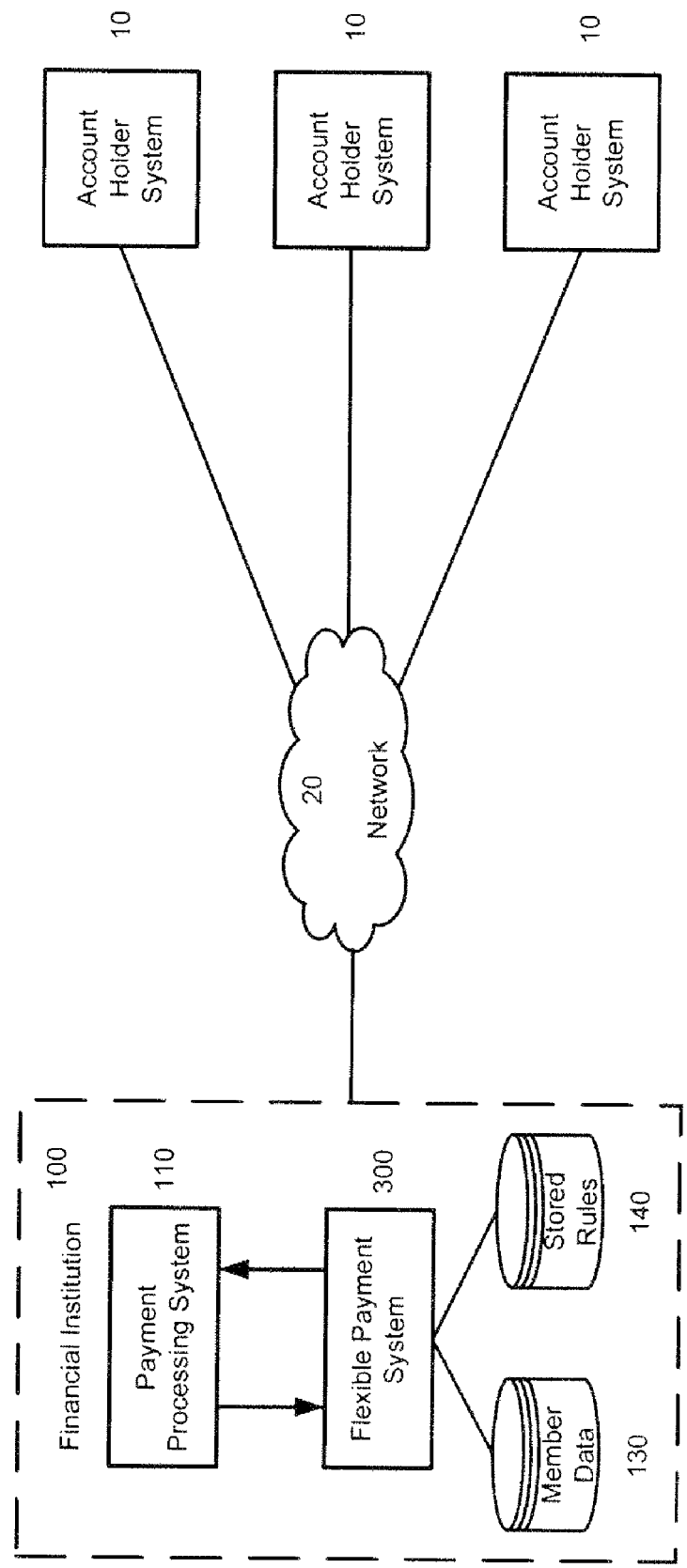
FIG. 1 is a block diagram illustrating an operating environment for a flexible payment system in accordance with an embodiment of the invention.

FIG. 1 is a block diagram illustrating an operating environment for a flexible payment system in accordance with an embodiment of the invention. Account holder systems 10 may be connected over a network 20 to a financial institution 100 having various computing components. For example, the financial institution 100 may include a payment processing system 110 that interfaces with a flexible payment system 300. The flexible payment system 300 preferably accesses or includes member data 180 and stored rules 140, which both may be contained in accessible databases. The financial institution likely contains many additional computing systems which are omitted herein for simplicity.

The account holder systems 10 may be personal computing systems enabling credit account holders to connect over the network 20 with the flexible payment system 300 of the financial institution 100. These account holder systems 10 may for example, include desktop or laptop computers and handheld or mobile devices.

The network 20 may be or include a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The payment processing system 110 may be a known system associated with processing credit payments within the financial institution 100. Although not shown, the payment processing system 110 may be linked not only to credit accounts, but also to other types of customer accounts in order to expedite and facilitate payment to credit accounts. The payment processing system 110 is configured to share information with the flexible payment system 300.

The flexible payment system 300, member data 130, and stored rules 140 will be described in greater detail with reference to FIGS. 2-6. The flexible payment system 300 allows credit customers to accrue flex units for in return for early payments so that subsequent payments may be delayed at a later date. In embodiments of the invention, the entire credit balance must be paid early in order for a customer to earn flex units. However, in other embodiments of the invention, a customer may earn flex units by paying a fraction of the credit balance early as long as the entire credit balance is paid by the due date. In either case, when a customer chooses to utilize the earned flex units at a later date, the financial institution does not charge the customer interest, late fees, or finance charges or assess any other penalty as long as the flex units are sufficient to cover the late payment.

In embodiments of the system, despite the flexibility of payment, customers may continue to receive monthly bills in accordance with the known monthly billing cycles. However, when a customer accrues flex units, during the next billing cycle, the customer's bill might include an "actual" due date, which is a normal due date set by the bank as well as an "adjusted" or "flexible" due date, which is set based on the number of flexible payment units the customer has banked. In preferred embodiments, whenever the customer has paid the previous statement in full and has banked enough flex units, a flex due date will appear on the next statement. Early payment days and dollars may be manipulated in a number of ways in order to determine a formula for determining accrued flexible payment units.

If the customer continues to pay early and does not take advantage of the adjusted due date, the customer will continue to accrue flexible payment units. In embodiments of the invention, a cap may be placed on the number of flexible payment units that a customer can accumulate over a given time period or on a number of flexible payment units the customer can use during a given time period. In additional embodiments of the invention, the accrued flex units can be used to adjust payment dates for multiple credit cards, such as a personal card, a business card, or even the card of another family member. In still further embodiments, rewards points extracted from a credit card rewards program may be converted accrued flex units and vice versa. In this context, reference is made to commonly assigned U.S. patent application Ser. No. 12/044,220, which provides a system for converting early payments to rewards points. The present application fully incorporates this disclosure by reference. Such a system could be integrated with or linked to the system disclosed herein.

In still further embodiments of the flexible payment system, preferred customers may be entitled to carry a negative balance of flex units. The statements would then reflect a need for the customer to pay early in order to return to a zero or positive balance.

As explained above, the method and system are particularly useful to small business customers that have difficulty regulating cash flow and require flexibility in payment cycles. The flexible payment system is likely to allow small business customers to pay their bills to correspond with their own receipt of payments.

Figure 2:
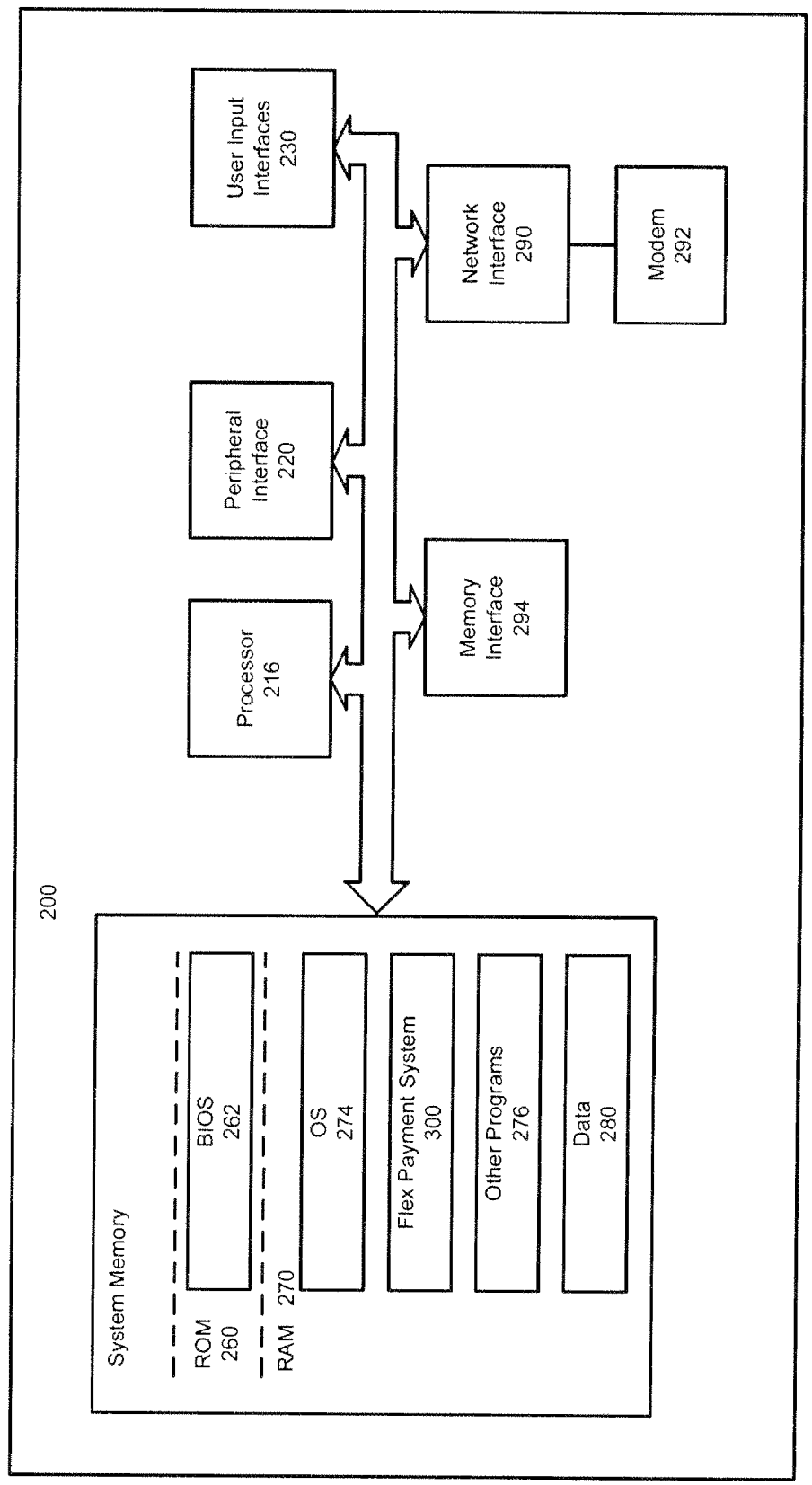
FIG. 2 is a block diagram illustrating an exemplary computing, environment for the flexible payment system in accordance with an embodiment of the invention.

FIG. 2 is a block diagram illustrating an exemplary computing environment for the flexible payment system 200 in accordance with an embodiment of the invention. The components shown in FIGS. 1-3 below may be or include a computer or multiple computers. The components may be described in the general context of computer-executable instructions, such as program modules, being executed by a computer. Generally, program modules include routines, programs, objects, components, data structures, etc. that performs particular tasks or implement particular abstract data types.

The configuration shown in FIG. 2 is merely exemplary and should not be construed as limiting. It is likely that multiple computing systems or devices will be utilized to implement the method and system in accordance with embodiments of the invention. The computing system 200 may include a processing unit 210, a peripheral interface 220, a user input interface 230, a system bus 240, a system memory 250, a network interface 290, a connected modem 292, and a memory interface 294. The system bus 240 may be provided for coupling the various system components.

Computers typically include a variety of computer readable media that can form part of the system memory and be read by the processing unit. By way of example, and not limitation, computer readable media may comprise computer storage media and communication media. The system memory 250 may include computer storage media in the form of volatile and/or nonvolatile memory such as read only memory (ROM) 260 and random access memory (RAM) 270.

A basic input/output system (BIOS) 262, containing the basic routines that help to transfer information between elements, such as during start-up, is typically stored in ROM 260. RAM 270 typically contains data and/or program modules that are immediately accessible to and/or presently being operated on by processing unit. The data or program modules may include an operating system 274, flexible payment system 300, other program modules 276, and program data 280. The operating system may be or include a variety of operating systems such as Microsoft Windows® operating system, the Unix operating system, the Linux operating, system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory 250 includes at least one set of instructions that is either permanently or temporarily stored. The processor 210 executes the instructions that are stored in order to process data. The set of instructions may include various instructions that perform a particular task or tasks, such as those shown in the appended flowchart. Such a set of instructions for performing a particular task may be characterized as a program, software program, software, engine, module, component, mechanism, or tool. The flexible payment system 200 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention, Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit 210 that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), UID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface 230 that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface 220. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention. These networks may include any of those described above with reference to FIG. 1. Although many other internal components of the computer are not shown, those of ordinary skill in the art will appreciate that such components and the interconnections are well known. Accordingly, additional details concerning the internal construction of the computer need not be disclosed in connection with the present invention.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Although the aforementioned components are shown as discrete modules, each of the modules may alternatively be integrated with one another. If the modules are discrete, multiple modules may operate cooperatively as will be further explained below.

Figure 3:
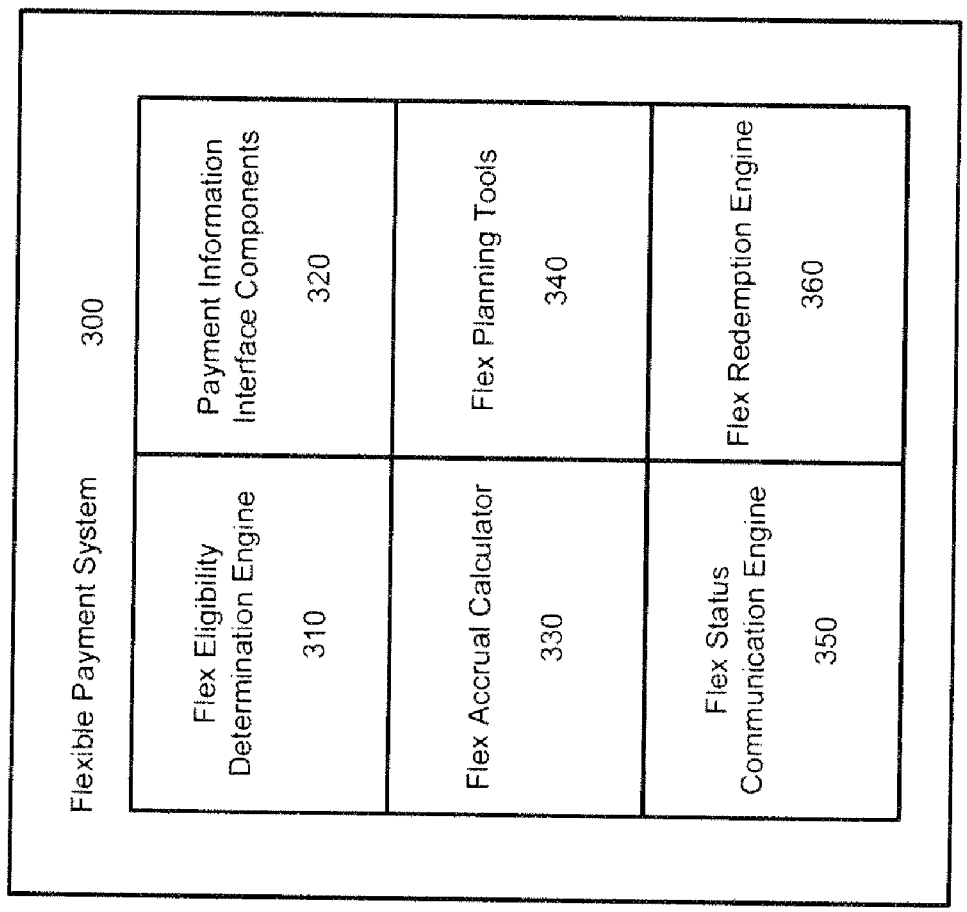
FIG. 3 is a block diagram illustrating components of a flexible payment system in accordance with an embodiment of the invention.

FIG. 3 is a block diagram illustrating components of the flexible payment system 300 in accordance with an embodiment of the invention. The flexible payment system 300 may include a flex eligibility determination engine 310, payment information interface components 320, a flex accrual calculator 330, flex planning tools 340, a flex status communication engine 350, and a flex redemption engine 360. These components, although shown as discrete components, may optionally be combined in various configurations. When executed by one or more computer processors as described above, the components perform the functions of the flexible payment system 300 as will be further described herein.

The flex eligibility determination engine 310 may access a customer record to determine customer eligibility. Customer eligibility may be determined, for example, for enrollment in the flex accrual program, for adding accrued flex units, and for redeeming accrued flex units. Thus, in addition to operating upon enrollment, the flex eligibility determination engine 310 may operate upon receipt of each payment to determine if the payment and the customer are eligible for flex accrual or flex redemption. Eligibility may be based on customer identity, payment amount, payment date, account type, or other factors as will be further described below.

The payment information interface components 320 exchange information with the payment processor of the financial institution as illustrated in FIG. 1. For instance, the payment processor of the financial institution may forward a payment amount, payment date, and customer identity to the payment information interface components 320. Optionally, the flexible payment system 300 may be integrated with the payment processor of the financial institution so that the exchange of information will occur internally. In either instance, the flex payment status of the customer is also passed back from the payment information interface components 320 to the payment processor.

The flex accrual calculator 330 applies stored rules and formulas to determine accrued flex units. The flex accrual calculator 330 operates each time a payment is received to determine whether the payment is eligible for accrual. If the customer intends the payment to be timed to utilize accrued flex units, the flex accrual calculator 330 may deduct the appropriate number of accrual units from the customer record according to stored rules and formulas. This deduction may be directed by the customer through an opt-in feature by which the customer opts in to utilize flex units.

In embodiments of the invention, customers may pay early on a regular basis and accrue flex units nearly every month. However, embodiments of the invention may impose a cap on the accrued flex units and the flex calculator will detect a condition that occurs when the cap is exceeded.

In embodiments of the invention, in order to participate in the flexible payment system, the customer must have a zero balance and must be paying the current statement in full. The accrued flex units may be calculated according to a formula, such as for example $$(\text{days early}) \times (\text{amount paid}) = \text{flex units} \quad (1)$$

For example, if a customer's amount due is $2000 and the customer pays that amount ten days earlier, the customer banks $20,000 flex units. Redemption of flex units may also be defined by a formula. For example, if a customer wants to determine how late he can pay without penalty, he may implement the following formula: redemption flex units may be defined by:

$$\text{days late} = (\text{flex units})/(\text{amount due}) \quad (2)$$

In yet further embodiments, the redemption formula may be varied depending on the customer or customer eligibility level. For instance, the number of days late may be defined by:

$$\text{days late} = 0.5(\text{flex units})/(\text{amount due}) \quad (3)$$

In the example of equation (3), each unit is only redeemable at half of its original accrued value.

Furthermore, any of the formulas disclosed in the parent application for calculated rewards amount may also be implemented for calculation of flex units in embodiments of the invention. Another embodiment may be implemented based on early payment of partial balance. Such an embodiment might reduce penalties for late payments.

Furthermore, various limits and restrictions may be imposed in order to prevent customers from manipulating the system. For example, limits may be imposed to prevent customers from benefiting from paying a very small amount of balance well in advance in order to make un-penalized late payments at a later date. Restrictions may placed on the number of days early that a customer can pay. For example, in one embodiment of the invention, all early payments must be made within a specified billing cycle. Other limits on time periods and payment amounts may also be imposed.

The flex planning tools 340 may allow a customer to schedule payments in advance based on accrued flex units. For example, operators of seasonal businesses as described above may accrue flex units for six months and may schedule payments every two months for the remaining six months. Thus, the flex planning tools 340 enable a monthly cycle to be converted to a bi-monthly cycle for half of the calendar year. The flex planning tools 340 are preferably provided through a user-interface offering visualization and manipulation of payment dates.

With flex planning tools 340 provided over the Internet on user interface, the planning tools 340 may include a slider interface that shows the customer variations of how much can be paid on which dates. The planning tools 340 facilitate visualization of the number of days and amount that the customer is entitled to defer.

The flex planning tools 340 may enable a customer to accumulate flex units by pre-programming the system to pay as early as possible through automatic deduction from a checking or other account in order to accumulate benefits as quickly as possible. The flex planning tools may further include options for transferring accrued flex units to the card of a family member or to another destination.

Furthermore, the flex planning tools 340 may explicitly require a customer to "opt in" to redeem accrued flex units. The flex planning tools 340 may further require the customer to explicitly opt in to enable accrual of flex units.

Although the flex planning tools 340 as shown, may be provided on a user interface of a PC, planning tools may also be provided in text format for mobile devices. For example, a text message may be transmitted that states "Remember that your bill is due and you have accrued flex units. Do you want to use these units?" If the customer selects "yes", then the user interface may request an indication of how many flex units or it may divert the customer to an automatic payment system in order to set up the next payment.

The flex status communication engine 350 preferably provides communications to customers regarding flex accrual and flex redemption. The flex status communication engine 350 may operate by sending text messages or emails to mobile devices or other computing devices. The flex status may be or include, for example, a payment reminder, a statement of accrued flex units, or a statement of used flex units. The flex status communication engine 350 may for example include or incorporate a web application or mobile application that shows customers a number of accrued available flex units.

In yet further embodiments of the invention, the flex status communication engine 350 may communicate through an LED screen on the registered credit card that provides number of accrued flex units available.

The flex redemption engine 360 operates to redeem flex units and deduct accrued flex units from customer records upon redemption of the accrued flex units. Thus, the flex redemption engine 360 may access the payment processing system and the customer record to transfer any necessary information.

In embodiments of the invention flex unit redemption may be set by the customer to be performed automatically by the flex redemption engine 360. If the customer visits her account online, for example, she can save flex accrual units for a particular season. Furthermore, she may be able to tie payment directly to a checking account with the financial institution. The customer may further be able to set payment such that when the account has the required amount of funds, the credit bill is automatically paid and any necessary flex units are redeemed.

Figure 4:
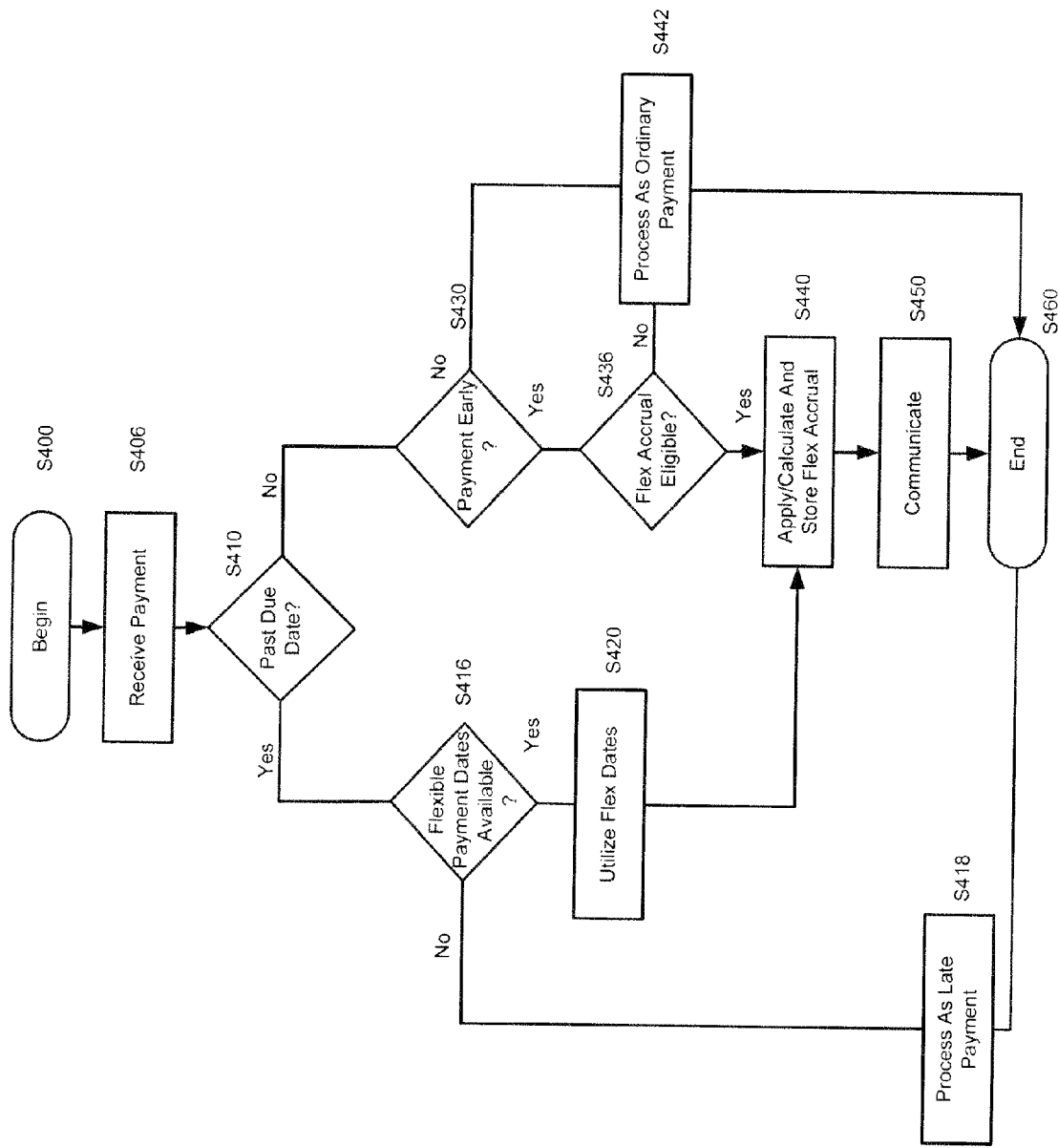
FIG. 4 is a flow chart illustrating a method for processing payments in accordance with an embodiment of the invention.

FIG. 4 is a flow chart illustrating a method for processing payments in accordance with an embodiment of the invention. In S400, the method begins and the payment processor system receives payment in S406. In S410, the system determines whether the payment is past the payment due date. If the payment is not past the payment in S410, the payment is further analyzed for eligibility for flex accrual on the right branch of the flow chart. If the payment is past the payment due date in S410, eligibility for use of flex accrual units is analyzed on the left branch of the flow chart.

Thus, to determine whether a payment is eligible for flex accrual, the system determines if the payment is early in S430. If the payment is not early, then the payment does not result in flex accrual and the payment is processed as an ordinary payment in S442. However, if the payment is early, the parameters are further analyzed in S436 to determine if the payment is eligible for flex accrual. If the results of the analysis are negative, the payment is processed as an ordinary payment in S442. If the results of the analysis are positive, the flex accrual formula is applied to calculate accrued flex units and the accrued flex units are stored in S440. The accrual is subsequently communicated to the customer in S450 and the process ends in S460.

As stated above, if the payment is past the due date in S410, the system may examine the payment to determine if it is eligible to utilize flex accrual units. Thus, in S416, the system determines whether flexible payment dates are available. If flexible payment dates are available in S416, the system utilizes the flex dates in S420 and stores the new flex accrual value in S440. Again, in S450, the utilization of flex units and current flex status may be communicated to the customer. However, if flexible payment dates are not available in S416, the system processes the received payment as a late payment in S418 and the method ends in S460.

Figure 5:
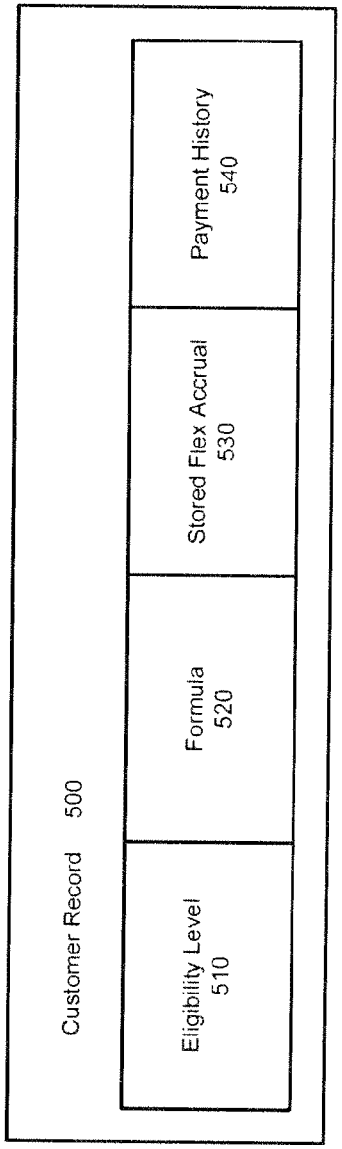
FIG. 5 is a block diagram illustrating an exemplary customer record stored in the flexible payment system in accordance with an embodiment of the invention.

FIG. 5 is a block diagram illustrating an exemplary customer record 500 stored in the flexible payment system in accordance with an embodiment of the invention. The customer record 500 may include a stored eligibility level 510, a stored formula 520 for calculating flex accrual, stored flex accrual units 530, and payment history 540.

The stored eligibility level 510 may relate to a level of accrual to which a customer is entitled. This level of accrual may for based on factors such as the customer's net worth to financial institution, measured by existing balances in various accounts or by a typical total charged amount to the credit account each month.

The stored formula 520 may be provided for calculating flex accrual and/or flex redemption for the particular customer. The customer record 500 may include the formula or alternatively a pointer to the formula, which may be stored elsewhere.

Stored flex accrual units 530 may be stored in the customer record. Each flex accrual unit may be calibrated to a combined number of days and a dollar amount.

The payment history 540 may also be stored in the customer record 500 and may be implemented in flex accrual calculations where appropriate.

Figure 6:
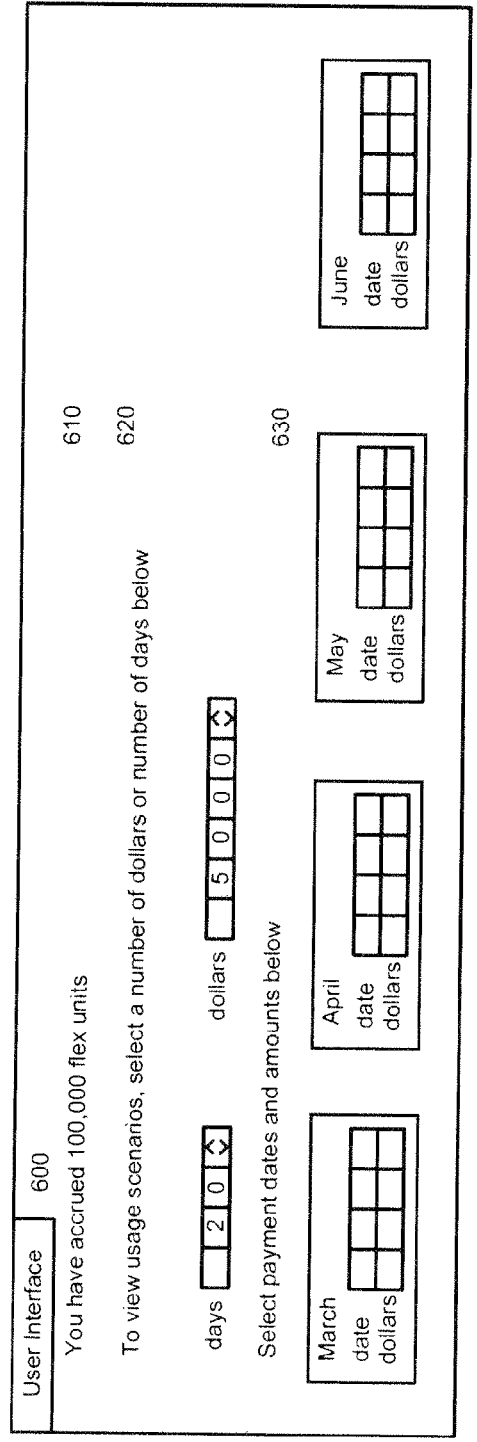
FIG. 6 is an exemplary user interface illustrating payment planning tools in accordance with an embodiment of the invention.

FIG. 6 is an exemplary user interface illustrating payment planning tools as presented in a user interface 600 in accordance with an embodiment of the invention. The user interface 600 may inform a customer at 610 of accrued flex units. A planning tool 620 may allow customers to manipulate days or dollars to illustrate the reach of the accrued flex units. In the illustrated example, the customer has 100,000 flex units. If the customer enters a number of days late (20) that he or she wishes to pay, the system may provide the number of dollars (5000) that can be delayed for the selected number of days. A customer may wish to view this option when the customer is due to receive a large payment twenty days after the payment is due. Alternatively, the customer may enter the amount that he wishes to pay late. This amount, may for example, be the entire outstanding credit balance due. In the illustrated example, the amount is $5000. By entering $5000 in the user interface, the customer will discover that he can pay this balance twenty days late without penalty.

A further feature 630 allows the customer to select payment dates and dollars by month. If the customer has earned sufficient flex units, the customer may be able to skip one or more months of payments. Ideally, the user interface will display remaining flex units after each payment date is scheduled by the customer. Thus, the customer can review and revise payment dates upon entry.

Furthermore, the due date may be incrementally moved up for larger amounts of balance or incrementally moved back for smaller balances. Thus, the customer may be given an adjusted due date of twenty days late if the next bill is only $1000 or and adjusted due date of eight days late for an amount up to $2400, or an adjusted due date of five days late for an amount up to $3000. In this example, if the next statement has a balance of over $20,000, the customer would not have a late payment option during that month unless previous flex units had been earned.

Stored rules may require that flex units be utilized only for payments no more than twenty five days late during, any billing cycle. While the customer may continue to accrue flex units, the customer may not be able to use them to pay bills several months beyond the predetermined bank due date. Instead, the customer may be required to pay the bill prior to completion of the next billing cycle.

Thus, the flexible payment system and method disclosed herein provide payment flexibility to credit card customers. The payment flexibility will be particularly useful to small business and seasonal business operators.

While particular embodiments of the invention have been illustrated and described in detail herein, it should be understood that various changes and modifications might be made to the invention without departing from the scope and intent of the invention.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A computerized method for enhancing payment flexibility implementing a computer processor accessing at least one storage medium, the method comprising:
   receiving payment notification upon payment of a credit bill by an identified customer, the payment notification including a payment amount and a payment date for the identified customer;
   determining eligibility for flexible payment status implementing the computer processor, the determination based on the customer identity, the payment date, and a payment due date;
   calculating a flex accrual using the computer processor upon receipt of the payment from the customer when the customer is eligible for flexible payment status, the flex accrual based on the payment amount, the payment date, and the payment due date, wherein the flex accrual occurs only when the payment date is prior to the payment due date;
   communicating the flex accrual to the customer when the customer is eligible for flexible payment status; and
   allowing the identified customer to utilize the flex accrual by making a subsequent late payment in response to a subsequent credit bill without penalty when the customer is eligible for flexible payment status, wherein a number of days late and dollars paid are determined based on the flex accrual.

2. The method of claim 1, wherein calculating the flex accrual comprises calculating flex accrual units with a flex calculator as a product of a number of days early a payment is made and a number of dollars of the early payment.

3. The method of claim 2, further comprising providing a user interface for allowing the identified customer to pre-set late payment dates based on the flex accrual units.

4. The method of claim 3, further comprising providing a calculator on the user interface for facilitating determining of permissible late payments.

5. The method of claim 2, further comprising facilitating transfer of the flex units to an alternate credit account.

6. The method of claim 1, wherein determining eligibility for flexible payment status comprises determining whether the payment is received prior to an actual payment due date.

7. The method of claim 6, wherein determining eligibility for flexible payment status further comprises determining whether the payment amount is for the entire account balance and denying eligibility of the payment is less than the entire account balance.

8. The method of claim 1, further comprising receiving a late payment on a later date than a scheduled due date, determining if flex accrual is available, and utilizing the flex accrual to accept payment on the later date without penalty.

9. The method of claim 1, further comprising automatically deducting scheduled early payments from a checking account of the identified customer for a predetermined number of months to guarantee flex accrual.

10. The method of claim 1, further comprising storing and utilizing different flex accrual formulas for different customers, wherein a selected flex accrual formula for a particular customer corresponds to a customer eligibility level.

11. The system of claim 1, further comprising a database storing and utilizing different flex accrual formulas for different customers, wherein a selected flex accrual formula for a particular customer corresponds to a customer eligibility level.

12. The method of claim 1, further comprising showing an actual due date reflecting a standard monthly due date and a flexible due date calculated based on the flex accrual on a monthly credit bill transmitted to the customer.

13. A flexible payment processing computing system for determining a flex accrual allowing customers to make payments on a flexible schedule, the system comprising:
   a payment information interface for receiving information upon receipt of a customer credit payment pertaining to a customer payment amount, a customer payment date, and a corresponding due date;
   a computer storage medium storing instructions and customer identity information;
   at least one computer processor, the computer processor accessing the stored instructions to perform steps including,
      determining eligibility for flex accrual using a flex eligibility determination engine, the determination based on the customer identity, the payment date, and the corresponding due date;
      calculating the flex accrual upon receipt of the payment from the customer using a flex accrual calculator when the customer is eligible for flexible payment status, the flex accrual based on the payment amount, the payment date, and the payment due date, wherein the flex accrual occurs only when the payment date is prior to the payment due date;

utilizing the accumulated flex accrual through a flex redemption engine to accept a late payment in response to a payment for a subsequent credit bill for eligible customers; and communicating, using a flex communication engine, with the customers eligible for flexible payment status to provide flex accrual information determined by the flex accrual calculator.

14. The system of claim 13, further comprising flex planning tools including a user interface for allowing the customers to pre-set late payment dates.

15. The system of claim 13, wherein the flex accrual calculator calculates the flex accrual by calculating flex accrual units as a product of a number of days early a payment is made and a number of dollars of the early payment.

16. The system of claim 15, wherein the redemption engine facilitates transfer of the flex units to an alternate credit account.

17. The system of claim 13, wherein the flex eligibility determination engine determines eligibility for flexible payment status by determining whether the payment is received prior to an actual payment due date.

18. The system of claim 17, wherein determining eligibility for flexible payment status further comprises determining whether the payment amount is for the entire account balance and denying eligibility of the payment is less than the entire account balance.

19. The system of claim 18, further comprising a calculator on the user interface for facilitating determining of permissible late payments.

20. The system of claim 13, wherein the redemption engine receives a late payment on a later date than a scheduled due date, determining if flex accrual is available, and utilizing the flex accrual to accept payment on the later date without penalty.

21. The system of claim 13, wherein flex planning tools further automatically deduct scheduled early payments from a checking account of the customer for a predetermined number of months to guarantee flex accrual.

22. The system of claim 13, wherein the payment information interface displays a monthly statement showing an actual due date reflecting a standard monthly due date and a flexible due date calculated based on the flex accrual.

* * * * *